US012674876B2

(12) United States Patent
Jo et al.

(10) Patent No.: US 12,674,876 B2
(45) Date of Patent: Jul. 7, 2026

(54) ELECTRONIC DEVICE AND METHOD, IN ELECTRONIC DEVICE, FOR DETERMINING WHETHER OBJECT IS NEAR

(71) Applicant: SAMSUNG ELECTRONICS CO., LTD., Suwon-si (KR)

(72) Inventors: Jeonggyu Jo, Suwon-si (KR); Jaehwan Lee, Suwon-si (KR); Incheol Baek, Suwon-si (KR); Dongil Son, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 164 days.

(21) Appl. No.: 18/486,162

(22) Filed: Oct. 13, 2023

(65) Prior Publication Data

US 2024/0036182 A1     Feb. 1, 2024

Related U.S. Application Data

(63) Continuation of application No. PCT/KR2022/004977, filed on Apr. 6, 2022.

(30) Foreign Application Priority Data

Apr. 15, 2021     (KR) ........................ 10-2021-0049195

(51) Int. Cl.
| | |
|---|---|
| *G01S 11/14* | (2006.01) |
| *G06F 1/3206* | (2019.01) |
| *G10L 15/28* | (2013.01) |

(52) U.S. Cl.
CPC ............ *G01S 11/14* (2013.01); *G06F 1/3206* (2013.01); *G10L 15/28* (2013.01)

(58) Field of Classification Search
None
See application file for complete search history.

(56) References Cited

U.S. PATENT DOCUMENTS

| | | | |
|---|---|---|---|
| 9,389,690 B2 * | 7/2016 | Li | ......................... G06F 3/0304 |
| 9,897,696 B2 * | 2/2018 | Lee | ......................... G01S 15/04 |

(Continued)

FOREIGN PATENT DOCUMENTS

| | | | | | |
|---|---|---|---|---|---|
| CN | 105893982 A | * | 8/2016 | ......... | G06V 40/1306 |
| CN | 115268822 A | * | 11/2022 | ............. | G06F 3/162 |

(Continued)

OTHER PUBLICATIONS

Park Jong Hyun [KR]. KR20130081796 (A). Jul. 18, 2013. KR101884469 (B1). Aug. 1, 2018. English Machine Translation. (Year: 2013).*

(Continued)

*Primary Examiner* — Jonathan D Armstrong
(74) *Attorney, Agent, or Firm* — CANTOR COLBURN LLP

(57)     ABSTRACT

An electronic device, according to various embodiments, includes: an application processor including an audio processing module and a voice recognition module; a mic; a speaker; and a sensor hub. While the audio processing module included in the application processor is in a sleep state, the sensor hub generates an ultrasonic signal and provides the ultrasonic signal to the speaker so that the speaker outputs a first signal including the ultrasonic signal therethrough; receives, from the voice recognition module, a second signal inputted through the mic; and determines whether an object is near the electronic device, at least on the basis of the first signal and the second signal.

15 Claims, 11 Drawing Sheets

(56) References Cited

U.S. PATENT DOCUMENTS

| | | | |
|---|---|---|---|
| 2003/0081804 A1* | 5/2003 | Kates ................... | H04R 25/356 |
| | | | 381/316 |
| 2008/0114252 A1 | 5/2008 | Randall et al. | |
| 2013/0125045 A1* | 5/2013 | Sun ..................... | G06F 3/04883 |
| | | | 715/788 |
| 2013/0229508 A1* | 9/2013 | Li ......................... | G06F 1/3287 |
| | | | 348/77 |
| 2014/0025975 A1 | 1/2014 | Namgoong et al. | |
| 2014/0068306 A1 | 3/2014 | Oh et al. | |
| 2014/0149754 A1 | 5/2014 | Silva et al. | |
| 2016/0098076 A1 | 4/2016 | Chng et al. | |
| 2016/0098921 A1* | 4/2016 | Qutub ................... | G08C 23/02 |
| | | | 367/197 |
| 2016/0162016 A1 | 6/2016 | Lee et al. | |
| 2016/0217795 A1 | 7/2016 | Lee et al. | |
| 2016/0345113 A1* | 11/2016 | Lee ......................... | G01S 15/04 |
| 2019/0261094 A1 | 8/2019 | Greenlee | |
| 2020/0042683 A1 | 2/2020 | Lee et al. | |
| 2020/0158556 A1 | 5/2020 | Strutt et al. | |
| 2020/0249346 A1 | 8/2020 | Lim et al. | |

FOREIGN PATENT DOCUMENTS

| | | | |
|---|---|---|---|
| JP | 2006050505 | A | 2/2006 |
| JP | 2016502721 | A | 1/2016 |
| KR | 100800549 | B1 | 2/2008 |
| KR | 20130081796 | A | 7/2013 |
| KR | 20140011660 | A | 1/2014 |
| KR | 20140030033 | A | 3/2014 |
| KR | 20160055162 | A | 5/2016 |
| KR | 20160080538 | A | 7/2016 |
| KR | 20190023302 | A | 3/2019 |
| KR | 20200016132 | A | 2/2020 |

OTHER PUBLICATIONS

International Search Report mailed Jul. 13, 2022 for PCT/KR2022/004977.

Korean Office Action for KR Application No. 10-2021-0049195 mailed on Mar. 20, 2026, citing the above reference (s).

* cited by examiner

ELECTRONIC DEVICE AND METHOD, IN ELECTRONIC DEVICE, FOR DETERMINING WHETHER OBJECT IS NEAR

CROSS-REFERENCE TO RELATED APPLICATIONS

This application is a continuation of International Application No. PCT/KR2022/004977 designating the United States, filed on Apr. 6, 2022, in the Korean Intellectual Property Receiving Office and claiming priority to Korean Patent Application No. 10-2021-0049195, filed on Apr. 15, 2021, in the Korean Intellectual Property Office, the disclosures of each of which are incorporated by reference herein in their entireties.

TECHNICAL FIELD

Various embodiments of the disclosure relate to an electronic device and a method of determining whether an object is close in the electronic device.

BACKGROUND ART

An ultrasonic sensor may transmit an ultrasonic signal generated from an ultrasonic transmitter toward an object, receive an ultrasonic signal reflected from the object, and thus obtain information about the position and/or distance of the object.

A transmitter in the ultrasonic sensor may include a plurality of output elements (e.g., speakers). The plurality of output elements may output ultrasonic waves, and the ultrasonic waves may be reflected where there is a density change in space. For example, ultrasonic waves in a range of several kHz to hundreds of MHz may be transmitted from the plurality of output elements to an object and reflected from the object. The reflected ultrasonic waves vibrate a plurality of input elements (e.g., microphones) of a receiver, the plurality of input elements may output electrical pulses according to the vibrations, and these electrical pulses may be used in recognizing the object.

DETAILED DESCRIPTION OF THE INVENTION

Technical Problem

The transmittance of a panel is relatively very low (e.g., almost 0% in the visible ray band to infrared (IR) band (400 to 940 nm)) in a terminal having a waterproof structure. Therefore, when an optical proximity sensor may not be disposed on the rear surface of the panel of the terminal, an ultrasonic proximity sensor may be implemented using a top speaker and a top microphone of the terminal.

Technical Solution

Various embodiments of the disclosure may provide an electronic device for increasing visibility and performance using an ultrasonic proximity sensor in a terminal having a waterproof structure with a panel of a relatively low transmittance, and a method of determining whether an object is close in the electronic device.

Various embodiments of the disclosure may provide an electronic device for operating with low power without waking up a main processor, and a method of determining whether an object is close in the electronic device.

According to various embodiments, an electronic device includes: an application processor including an audio processing module and a voice recognition module, a microphone, a speaker, and a sensor hub. while the audio processing module is in a sleep state, the sensor hub generates an ultrasonic signal and provides the ultrasonic signal to the speaker so that the speaker outputs a first signal including the ultrasonic signal through the speaker, receive from the voice recognition module a second signal input through the microphone, and determine whether an object is close to the electronic device based on at least the first signal and the second signal.

According to various embodiments, a method of determining whether an object is close to an electronic device including an application processor including an audio processing module and a voice recognition module, a microphone, a speaker, and a sensor hub, includes: generating, by the sensor hub, an ultrasonic signal and providing the ultrasonic signal to the speaker so that the speaker outputs a first signal including the ultrasonic signal therethrough, while the audio processing module included in the application processor is in a sleep state; receiving, by the sensor hub, from the voice recognition module a second signal input through the microphone in the sleep state of the audio processing module; and determining, by the sensor hub, whether an object is close to the electronic device based on at least the first signal and the second signal in the sleep state of the audio processing module.

Advantageous Effects

In various embodiments, an electronic device may reduce power consumption by providing an ultrasonic proximity sensor operating without waking up a main processor.

In various embodiments, the electronic device may provide a low-power ultrasonic proximity sensor by determining whether an object is close using a voice recognition module.

MODE FOR CARRYING OUT THE INVENTION

Figure 1:
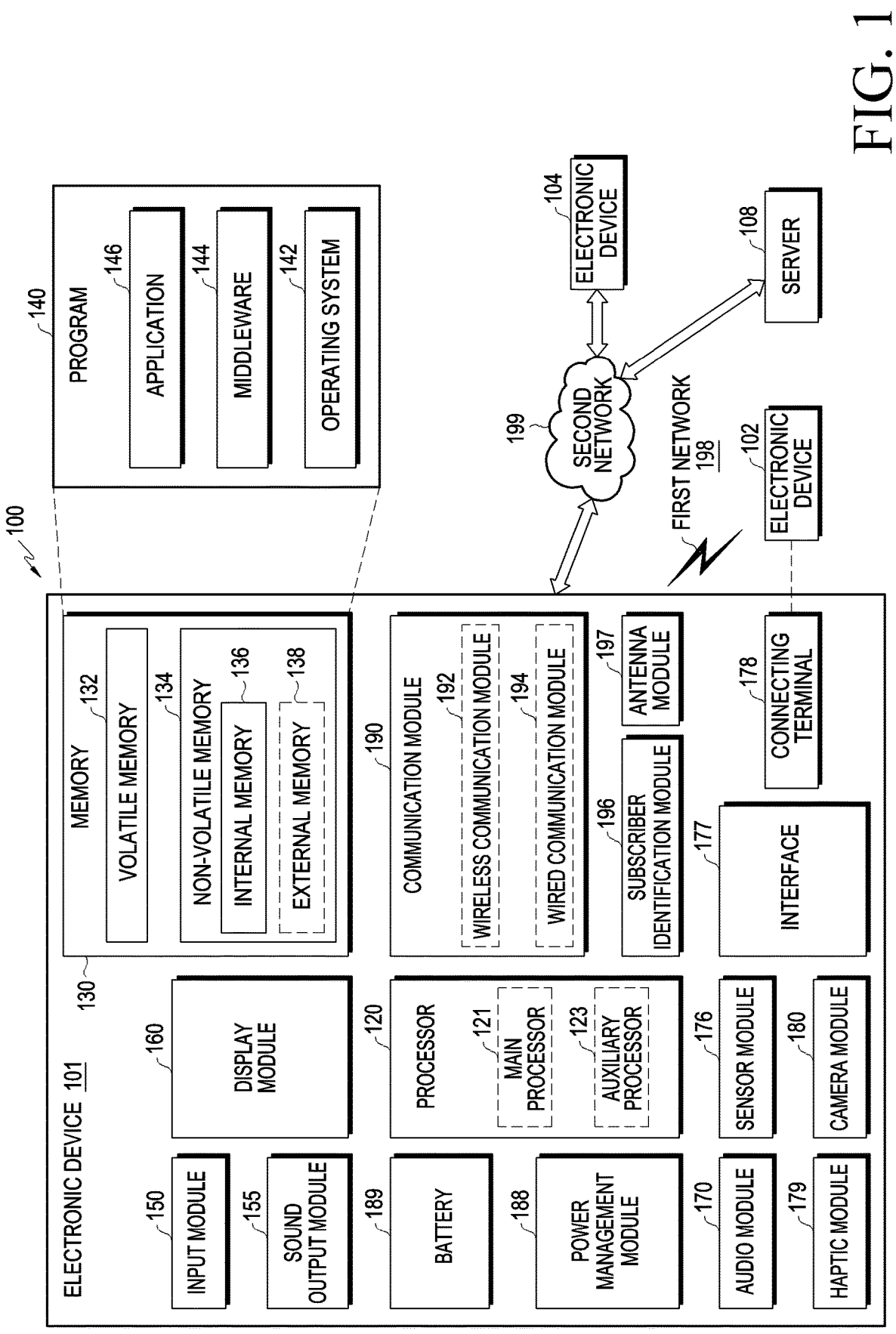
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form an mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
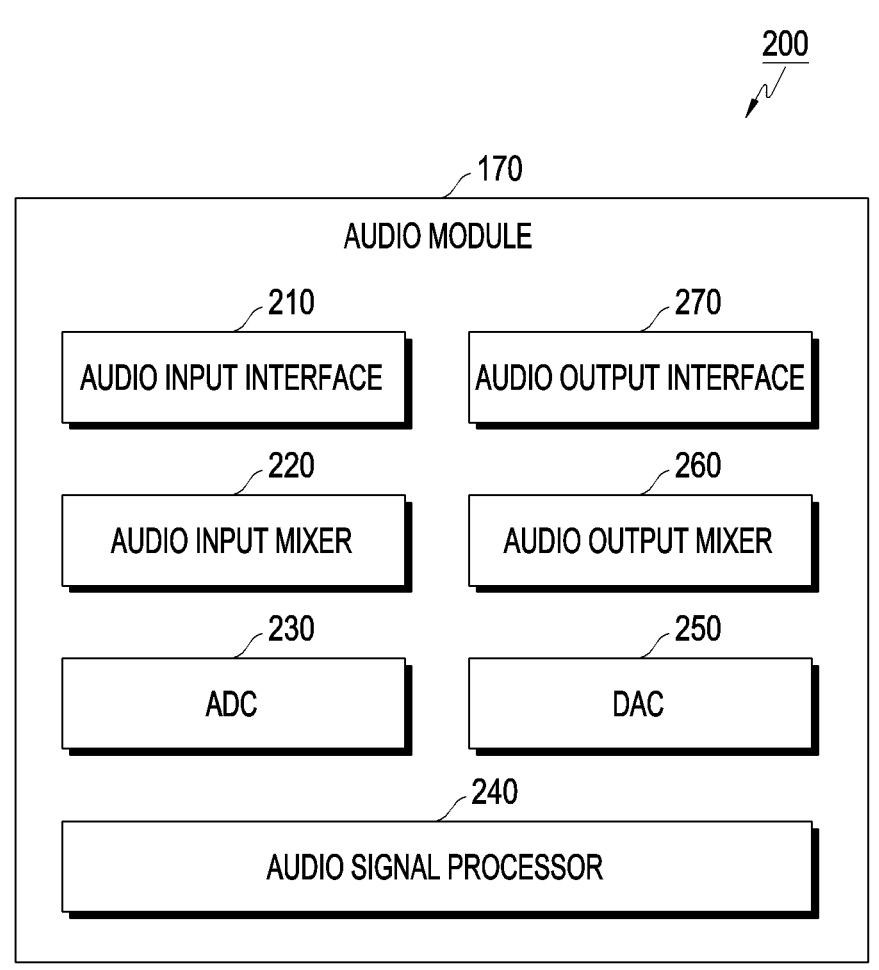
FIG. 2 is a block diagram illustrating an audio module according to various embodiments.

FIG. 2 is a block diagram 200 illustrating the audio module 170 according to various embodiments.

Referring to FIG. 2, the audio module 170 may include, for example, an audio input interface 210, an audio input mixer 220, an analog-to-digital converter (ADC) 230, an audio signal processor 240, a digital-to-analog converter (DAC) 250, an audio output mixer 260, or an audio output interface 270.

The audio input interface 210 may receive an audio signal corresponding to a sound obtained from the outside of the electronic device 101 via a microphone (e.g., a dynamic microphone, a condenser microphone, or a piezo microphone) that is configured as part of the input module 150 or separately from the electronic device 101. For example, if an audio signal is obtained from the external electronic device 102 (e.g., a headset or a microphone), the audio input interface 210 may be connected with the external electronic device 102 directly via the connecting terminal 178, or wirelessly (e.g., Bluetooth™ communication) via the wireless communication module 192 to receive the audio signal. According to an embodiment, the audio input interface 210 may receive a control signal (e.g., a volume adjustment signal received via an input button) related to the audio signal obtained from the external electronic device 102. The audio input interface 210 may include a plurality of audio input channels and may receive a different audio signal via a corresponding one of the plurality of audio input channels, respectively. According to an embodiment, additionally or alternatively, the audio input interface 210 may receive an audio signal from another component (e.g., the processor 120 or the memory 130) of the electronic device 101.

The audio input mixer 220 may synthesize a plurality of inputted audio signals into at least one audio signal. For example, according to an embodiment, the audio input mixer 220 may synthesize a plurality of analog audio signals inputted via the audio input interface 210 into at least one analog audio signal.

The ADC 230 may convert an analog audio signal into a digital audio signal. For example, according to an embodiment, the ADC 230 may convert an analog audio signal received via the audio input interface 210 or, additionally or alternatively, an analog audio signal synthesized via the audio input mixer 220 into a digital audio signal.

The audio signal processor 240 may perform various processing on a digital audio signal received via the ADC 230 or a digital audio signal received from another component of the electronic device 101. For example, according to an embodiment, the audio signal processor 240 may perform changing a sampling rate, applying one or more filters, interpolation processing, amplifying or attenuating a whole or partial frequency bandwidth, noise processing (e.g., attenuating noise or echoes), changing channels (e.g., switching between mono and stereo), mixing, or extracting a specified signal for one or more digital audio signals. According to an embodiment, one or more functions of the audio signal processor 240 may be implemented in the form of an equalizer.

The DAC 250 may convert a digital audio signal into an analog audio signal. For example, according to an embodiment, the DAC 250 may convert a digital audio signal processed by the audio signal processor 240 or a digital audio signal obtained from another component (e.g., the processor 120 or the memory 130) of the electronic device 101 into an analog audio signal.

The audio output mixer 260 may synthesize a plurality of audio signals, which are to be outputted, into at least one audio signal. For example, according to an embodiment, the audio output mixer 260 may synthesize an analog audio signal converted by the DAC 250 and another analog audio signal (e.g., an analog audio signal received via the audio input interface 210) into at least one analog audio signal.

The audio output interface 270 may output an analog audio signal converted by the DAC 250 or, additionally or alternatively, an analog audio signal synthesized by the audio output mixer 260 to the outside of the electronic device 101 via the sound output module 155. The sound output module 155 may include, for example, a speaker, such as a dynamic driver or a balanced armature driver, or a receiver. According to an embodiment, the sound output module 155 may include a plurality of speakers. In such a case, the audio output interface 270 may output audio signals having a plurality of different channels (e.g., stereo channels or 5.1 channels) via at least some of the plurality of speakers. According to an embodiment, the audio output interface 270 may be connected with the external electronic device 102 (e.g., an external speaker or a headset) directly via the connecting terminal 178 or wirelessly via the wireless communication module 192 to output an audio signal.

According to an embodiment, the audio module 170 may generate, without separately including the audio input mixer 220 or the audio output mixer 260, at least one digital audio signal by synthesizing a plurality of digital audio signals using at least one function of the audio signal processor 240.

According to an embodiment, the audio module 170 may include an audio amplifier (not shown) (e.g., a speaker amplifying circuit) that is capable of amplifying an analog audio signal inputted via the audio input interface 210 or an audio signal that is to be outputted via the audio output interface 270. According to an embodiment, the audio amplifier may be configured as a module separate from the audio module 170.

Figure 3:
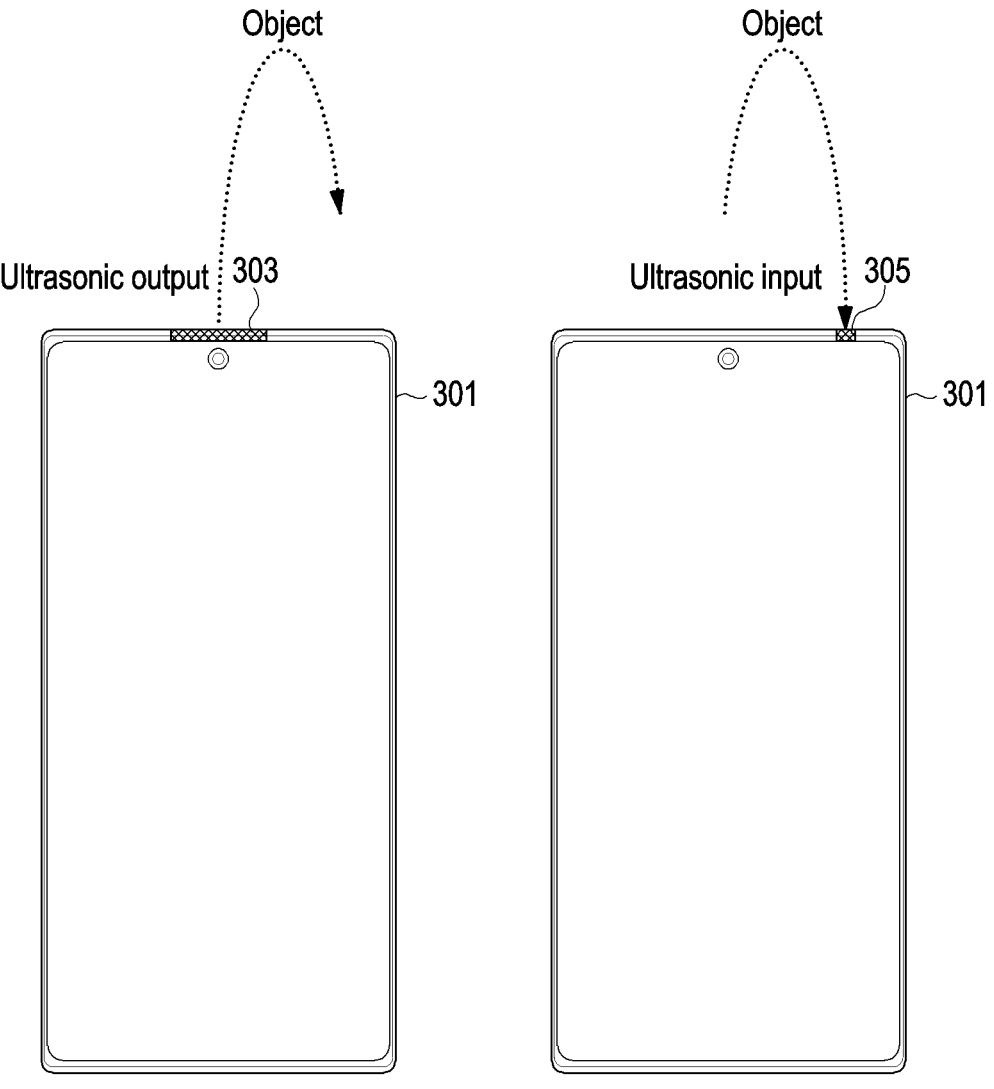
FIG. 3 is a diagram illustrating an operation of implementing an ultrasonic proximity sensor by an electronic device according to various embodiments.

FIG. 3 is a diagram illustrating an operation of implementing an ultrasonic proximity sensor by an electronic device according to various embodiments.

Referring to FIG. 3, an electronic device 301 (e.g., the electronic device 101 of FIG. 1) may include a top speaker 303 (e.g., the sound output module 155 of FIG. 1) for outputting an ultrasonic signal and a top microphone 305 (e.g., the input module 150 of FIG. 1) for receiving an ultrasonic signal.

According to various embodiments, the electronic device 301 may externally output a first signal including an ultrasonic signal through the top speaker 303. The electronic device 301 may receive a second signal including at least a part of the signal output through the top speaker 303 through the top microphone 305. According to various embodiments, the ultrasonic signal included in the first signal may be transmitted toward an object (or target), and the second signal may include an ultrasonic signal reflected from the object (or target). According to various embodiments, the electronic device 301 may estimate the position and/or distance of the object (or target) by using the ultrasonic signal reflected from the object (or target).

Figure 4:
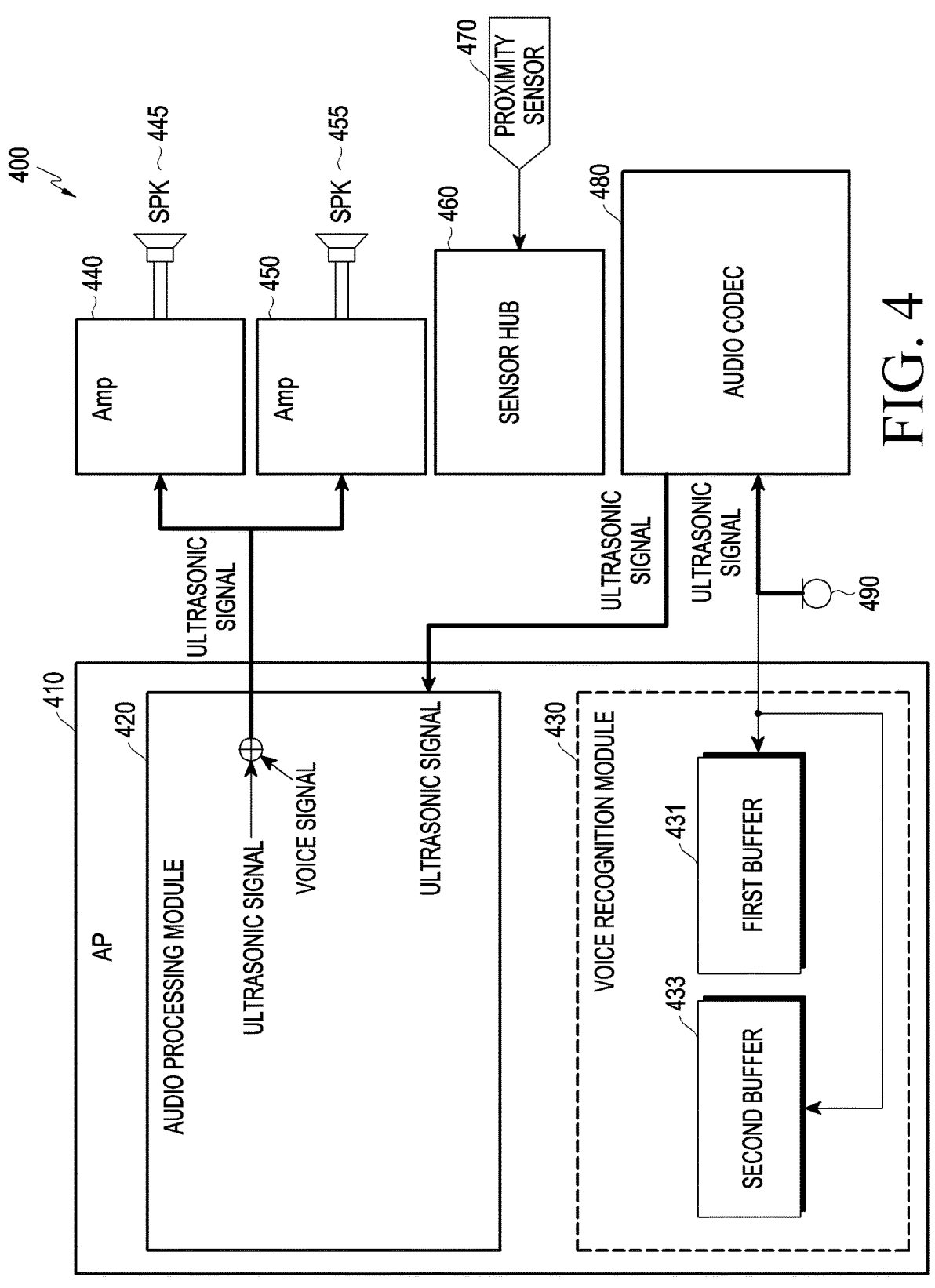
FIG. 4 is a block diagram illustrating an electronic device operating as an ultrasonic proximity sensor according to various embodiments.

FIG. 4 is a block diagram illustrating an electronic device for operating as an ultrasonic proximity sensor according to various embodiments.

Referring to FIG. 4, an electronic device 400 (e.g., the electronic device 101 of FIG. 1) may include an application processor (AP) 410 (e.g., the main processor 121 of FIG. 1), a first amplifier 440, a first speaker 445 (e.g., the sound output module 155 of FIG. 1), a second amplifier 450, a second speaker 455 (e.g., the sound output module 155 of FIG. 1), a sensor hub 460 (e.g., the auxiliary processor 123 of FIG. 1), a proximity sensor 470 (e.g., the sensor module 176 of FIG. 1), an audio codec 480, and a microphone 490 (e.g., the input module 150 of FIG. 1). According to various embodiments, the sensor hub 460 may be called a sensor module, a sensor hub processor, or a context awareness hub (CHUB). According to various embodiments, the sensor hub 460 may include an ultrasonic generation module (or an ultrasonic engine) for generating or processing an ultrasonic signal therein. According to various embodiments, the proximity sensor 470 may include at least one of an illuminance sensor or a 6-axis sensor. In FIG. 4, the numbers of amplifiers and speakers each is shown as two for convenience of description, to which the technical idea of the disclosure is not limited, and the numbers of amplifiers and speakers may vary.

According to various embodiments, the AP 410 may include an audio processing module 420 and a voice recognition module 430, and the voice recognition module 430 may include a first buffer 431 and a second buffer 433. According to various embodiments, the AP 410 may further include a sensor hub driver and a kernel driver. According to various embodiments, the audio processing module 420 may include an ultrasonic generation module (or an ultrasonic engine) for generating or processing an ultrasonic signal, and generate an ultrasonic signal used in implementing an ultrasonic proximity sensor through the ultrasonic generation module. According to various embodiments, the voice recognition module 430 may also be called a voice triggering system (VTS) and be implemented as a low-power processor that operates with relatively low power compared to the audio processing module 420 within the AP 410. According to various embodiments, the first buffer 431 may be implemented as a wake-up engine input buffer for activating the voice recognition module 430, and the second buffer 433 may be implemented as a back log buffer for storing input data for several seconds.

According to various embodiments, when the electronic device 400 provides a voice call service, the AP 410, the first amplifier 440, the first speaker 445, the second amplifier 450, the second speaker 455, the sensor hub 460, the proximity sensor 470, the audio codec 480, and the microphone 490 may be powered on, and the voice recognition module 430 may be powered off.

According to various embodiments, when the electronic device 400 provides the voice call service, the audio processing module 420 may generate an ultrasonic signal (e.g., 48 kHz) through the ultrasonic generation module (or ultrasonic engine) implemented therein, mix the generated ultrasonic signal with a voice signal, and transmit the mixed signal to the first amplifier 440 and the second amplifier 450. According to various embodiments, a first signal in which the ultrasonic signal and the voice signal are mixed may be output to the outside through the first amplifier 440 and the first speaker 445, and to the outside through the second amplifier 450 and the second speaker 455. According to various embodiments, the microphone 490 may receive a second signal including at least a part of the ultrasonic signal output through at least one of the first speaker 445 or the second speaker 455 and transmit the received second signal to the audio codec 480.

According to various embodiments, the audio codec 480 may encode at least a part of the ultrasonic signal received through the microphone 490 into a digital signal and transmit the encoded ultrasonic signal to the audio processing module 420. According to various embodiments, the audio processing module 420 may compare the encoded ultrasonic signal transmitted from the audio codec 480 with the ultrasonic signal generated through the ultrasonic generation module (or ultrasonic engine) implemented therein, and determine whether there is an object close to the electronic device 400 or a distance to the object based on a comparison result. According to various embodiments, the audio processing module 420 may transmit sensing information about whether there is an object close to the electronic device 400 to the sensor hub 460.

According to various embodiments, the sensor hub 460 may receive a sensed measurement value from the proximity sensor 470 (e.g., the illuminance sensor or the 6-axis sensor). According to various embodiments, the sensor hub 460 may finally determine whether there is a close object based on both the sensing information about whether there is a close object, and transmitted from the audio processing module 420 and the sensed measurement value from the proximity sensor 470.

Figure 5:
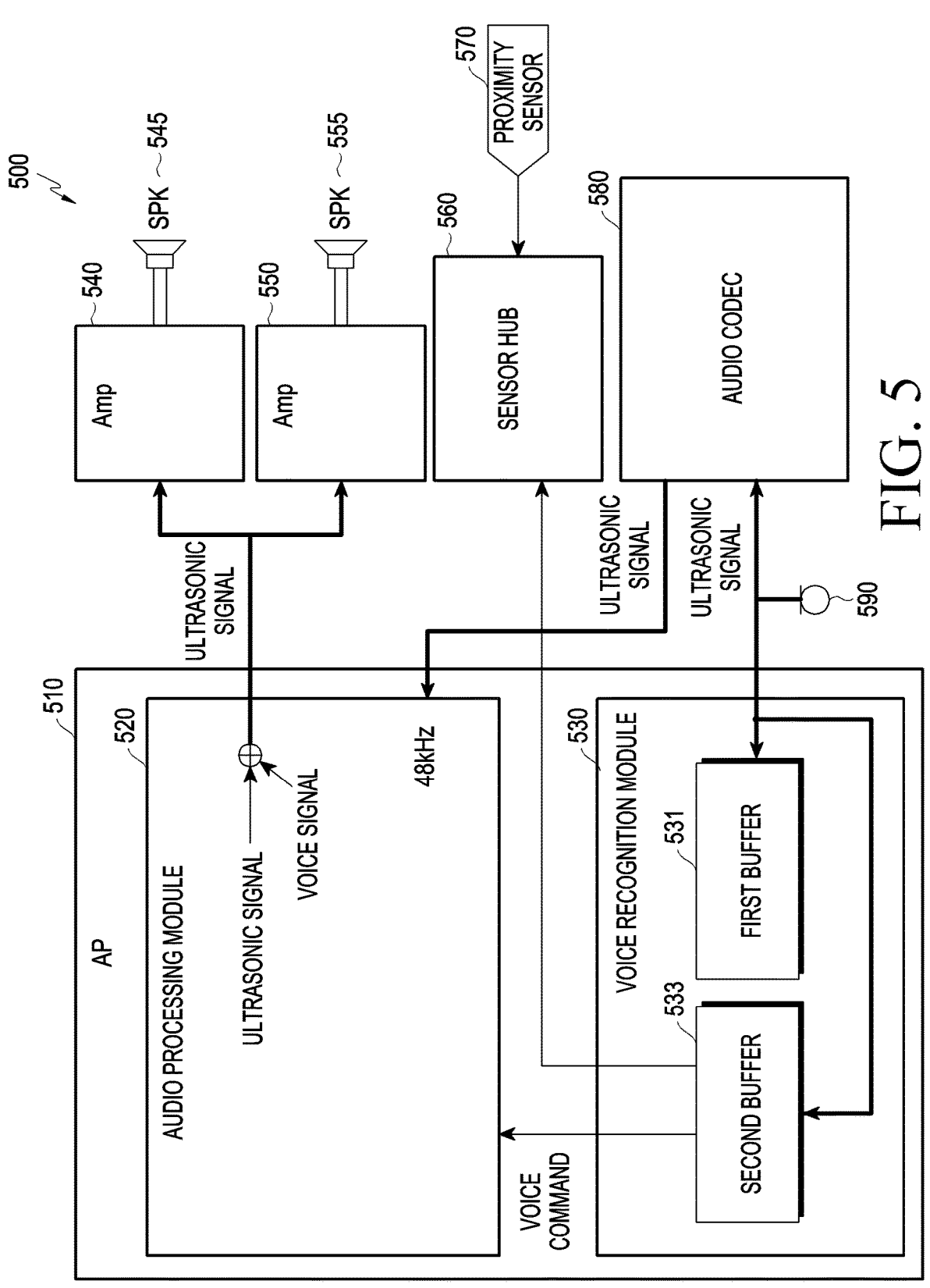
FIG. 5 is a block diagram illustrating an electronic device operating as an ultrasonic proximity sensor according to various embodiments.

FIG. 5 is a block diagram illustrating an electronic device operating as an ultrasonic proximity sensor according to various embodiments.

Referring to FIG. 5, an electronic device 500 (e.g., the electronic device 101 of FIG. 1) may include an AP 510 (e.g., the main processor 121 of FIG. 1), a first amplifier 540, a first speaker 545 (e.g., the sound output module 155 of FIG. 1), a second amplifier 550, a second speaker 555 (e.g., the audio output interface 270 of FIG. 2), a sensor hub 560 (e.g., the auxiliary processor 123 of FIG. 1), a proximity sensor 570 (e.g., the sensor module 176 of FIG. 1), an audio codec 580, and a microphone 590 (e.g., the input module 150 of FIG. 1). According to various embodiments, each of the components 510 to 590 in the electronic device 500 illustrated in FIG. 5 may perform the same function as a corresponding one of the components 410 to 490 in the electronic device 400 illustrated in FIG. 4, and its repeated description will be avoided. In FIG. 5, the numbers of amplifiers and speakers each is shown as two for convenience of description, to which the technical idea of the disclosure is not limited, and the numbers of amplifiers and speakers may vary.

According to various embodiments, when the electronic device 500 provides a call service in an always-on state, the AP 510, a voice recognition module 530, the first amplifier 540, the first speaker 545, the second amplifier 550, the second speaker 555, the sensor hub 560, the proximity sensor 570, the audio codec 580, and the microphone 590 may be powered on. Unlike the voice call service illustrated in FIG. 4, the voice recognition module 530 may be powered on during the call service in FIG. 5.

According to various embodiments, when the electronic device 500 provides a service in the always-on state, the audio processing module 520 may generate an ultrasonic signal (e.g., 48 kHz) through an ultrasonic generation module (or ultrasonic engine) implemented therein, mix the generated ultrasonic signal with a voice signal, and transmit the mixed signal to the first amplifier 540 and the second amplifier 550. According to various embodiments, a first signal in which the ultrasonic signal and the voice signal are mixed may be output to the outside through the first amplifier 540 and the first speaker 545, and to the outside through the second amplifier 550 and the second speaker 555. According to various embodiments, the microphone 590 may receive a second signal including at least a part of the ultrasonic signal output through at least one of the first speaker 545 or the second speaker 555 and transmit the received second signal to the voice recognition module 530 and the audio codec 580.

According to various embodiments, the voice recognition module 530 may store the second signal received through the microphone 590 in the first buffer 531 and the second buffer 533, and transmit a user voice command (e.g., a voice command set in Bixby™) included in the second signal to the audio processing module 520. According to various embodiments, the audio processing module 520 may perform a configured operation based on the user voice command transmitted from the voice recognition module 530.

According to various embodiments, the audio codec 580 may encode at least a part of the ultrasonic signal received through the microphone 590 into a digital signal, and transmit the encoded ultrasonic signal to the audio processing module 520. According to various embodiments, the audio processing module 520 may compare the encoded ultrasonic signal transmitted from the audio codec 580 with the ultrasonic signal generated through the ultrasonic generation module (or ultrasonic engine) implemented therein, and determine whether there is an object close to the electronic device 500 or a distance to the object based on a comparison result. According to various embodiments, the audio processing module 520 may transmit sensing information about whether there is an object close to the electronic device 500 to the sensor hub 560.

According to various embodiments, the sensor hub 560 may receive a sensed measurement value from the proximity sensor 570 (e.g., an illuminance sensor or a 6-axis sensor). According to various embodiments, the sensor hub 560 may finally determine whether there is a close object based on both the sensing information about whether there is an object close to the electronic device 500, and transmitted from the audio processing module 520 and the sensed measurement value from the proximity sensor 570.

Figure 6:
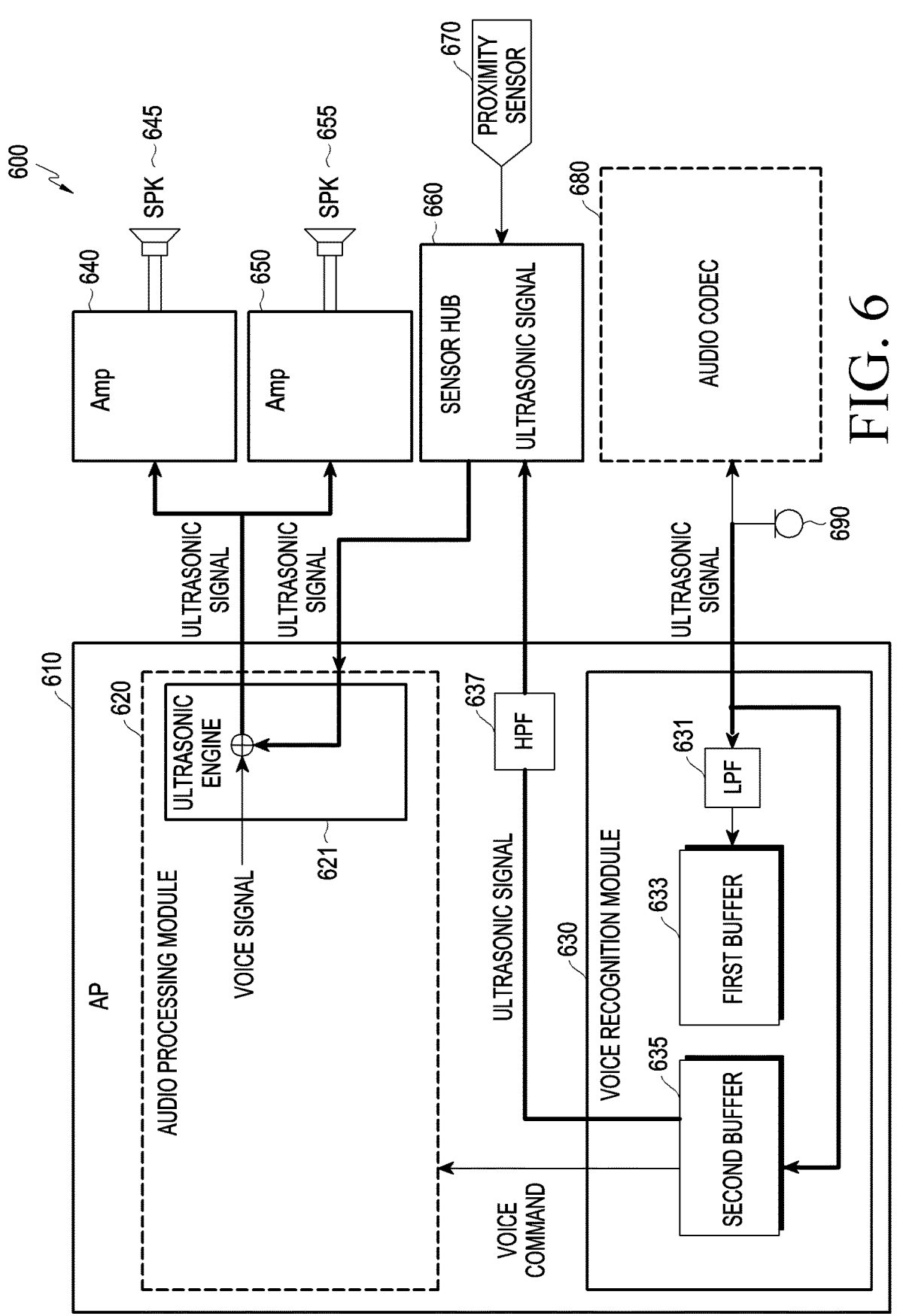
FIG. 6 is a block diagram illustrating an electronic device operating as an ultrasonic proximity sensor according to various embodiments.

FIG. 6 is a block diagram illustrating an electronic device operating as an ultrasonic proximity sensor according to various embodiments.

Referring to FIG. 6, an electronic device 600 (e.g., the electronic device 101 of FIG. 1) may include an AP 610 (e.g., the main processor 121 of FIG. 1), a first amplifier 640, a first speaker 645 (e.g., the sound output module 155 of FIG. 1), a second amplifier 650, a second speaker 655 (e.g., the audio output interface 270 of FIG. 2), a sensor hub 660 (e.g., the auxiliary processor 123 of FIG. 1), a proximity sensor 670 (e.g., the sensor module 176 of FIG. 1), an audio codec 680, and a microphone 690 (e.g., the input module 150 of FIG. 1). In FIG. 6, the numbers of amplifiers and speakers each is shown as two for convenience of description, to which the technical idea of the disclosure is not limited, and the numbers of amplifiers and speakers may vary.

According to various embodiments, the AP 610 may include an audio processing module 620, a voice recognition module 630, and a high pass filter (HPF) 637, and the voice recognition module 630 may include a low pass filter (LPF) 631, a first buffer 633, and a second buffer 635. According to various embodiments, the LPF 631 may be implemented outside the voice recognition module 630, and the HPF 637 may be implemented outside the AP 610. According to various embodiments, the AP 610 may further include a sensor hub driver and a kernel driver. According to various embodiments, the audio processing module 620 may include an ultrasonic generation module (or ultrasonic engine) 621 for generating or processing an ultrasonic signal, and generate an ultrasonic signal used in implementing an ultrasonic proximity sensor through the ultrasonic generation module 621. According to various embodiments, the voice recognition module 630 may also be called a VTS and be implemented as a low-power processor included in the AP 610. According to various embodiments, the first buffer 633 may be implemented as a wake-up engine input buffer for activating the voice recognition module 630, and the second buffer 635 may be implemented as a back log buffer for storing input data for several seconds.

According to various embodiments, when the electronic device 600 applies a low-power ultrasonic platform, the audio processing module 620 and the audio codec 680 may enter a sleep state, and the voice recognition module 630 and the first amplifier 640, the first speaker 645, the second amplifier 650, the second speaker 655, the sensor hub 660, the proximity sensor 670, and the microphone 690 may operate in a powered-on state. Compared to the electronic devices 400 and 500 illustrated in FIGS. 4 and 5, when the electronic device 600 of FIG. 6 applies a low-power ultrasonic platform, the audio processing module 620 and/or the audio codec 680 may be deactivated to the sleep state to reduce current consumption, and the electronic device 600 may be implemented as an ultrasonic proximity sensor by activating the voice recognition module 630.

According to various embodiments, when the electronic device 600 applies a low-power ultrasonic platform, the audio processing module 620 in the AP 610 may activate the voice recognition module 630 by transmitting a wakeup command to the voice recognition module 630. According to various embodiments, the audio processing module 620 may transfer a control authority for generating and processing ultrasonic waves to the sensor hub 660 and enter a sleep mode. According to various embodiments, the sensor hub 660 may generate an ultrasonic signal (e.g., 48 kHz) through an ultrasonic generation module (or ultrasonic engine) implemented therein, and transmit the generated ultrasonic signal to the first amplifier 640 and the second amplifier 650. According to various embodiments, the sensor hub 660 may generate an ultrasonic signal (e.g., 48 kHz) through the ultrasonic generation module (or ultrasonic engine) implemented therein, and transmit a first signal in which the generated ultrasonic signal is mixed with a voice signal to the first amplifier 640 and the second amplifier 650.

According to various embodiments, the ultrasonic signal or the first signal may be output to the outside through the first amplifier 640 and the first speaker 645, and to the outside through the second amplifier 650 and the second speaker 655. According to various embodiments, the microphone 690 may receive a second signal including at least a part of the ultrasonic signal output through at least one of the first speaker 645 or the second speaker 655 and transmit the received second signal to the voice recognition module 630.

According to various embodiments, the audio recognition module 630 may receive the second signal through the microphone 690, and the LPF 631 may filter the second signal (e.g., 8 kHz filtering) and transmit the filtered low-band signal to the first buffer 633. The first buffer 633 may perform a related operation based on a voice command signal (e.g., a wakeup signal) included in the filtered low-band signal. According to various embodiments, the second buffer 635 may receive the second signal including at least a part of the ultrasonic signal through the microphone 690, and the HPF 637 may filter the second signal (e.g., 20 kHz cut-off filtering) and transmit the filtered high-band signal (e.g., 20 to 48 kHz) to the sensor hub 660. According to various embodiments, the sensor hub 660 may receive a sensed measurement value from the proximity sensor 670 (e.g., an illuminance sensor or a 6-axis sensor). According to various embodiments, the sensor hub 660 may determine whether there is an object close to the electronic device 600 based on both the filtered high-band signal (e.g., 20 to 48 kHz) transmitted from the HPF 637 and the sensed measurement value from the proximity sensor 670.

According to various embodiments, the electronic device 600 implementing an ultrasonic proximity sensor may be used in various scenarios by using an ultrasonic signal, and implement a lower-power mode by operating without waking up the audio processing module 620, the audio codec 680, and a communication processor (not shown).

According to various embodiments, the electronic device 600 implementing an ultrasonic proximity sensor may be used to determine whether a user exists. According to various embodiments, the electronic device 600 may identify a distance between the electronic device 600 and a user using the ultrasonic proximity sensor implemented in FIG.

6, and a sound volume output from the electronic device 600. According to various embodiments, when an absent user approaches the electronic device 600, the electronic device 600 may provide a notification of a preset service (e.g., missed call notification and received message notification) to the user. According to various embodiments, the electronic device 600 may be configured to identify the distance between the electronic device 600 and the user, and be locked up when the distance is equal to or greater than a set threshold. According to various embodiments, when someone other than the user of the electronic device 600 approaches the electronic device 600, the electronic device 600 may provide a notification for privacy protection.

According to various embodiments, the electronic device 600 implementing an ultrasonic proximity sensor may detect a user gesture and provide various services based on the detected user gesture. According to various embodiments, the electronic device 600 may execute a specific application or change a display setting by identifying movement of the user's hand (or finger). According to various embodiments, the electronic device 600 may identify distances between the electronic device 600 and multiple objects during an operation of a camera auto-focusing function using an ultrasonic proximity sensor.

According to various embodiments, the electronic device 600 may detect a user gesture by implementing an ultrasonic proximity sensor in a mobile accessory device having a small or no display. According to various embodiments, when the electronic device 600 is a drone or a robot cleaner, it may implement a low-power ultrasonic proximity sensor, detect an obstacle, and provide an efficient service.

Figure 7:
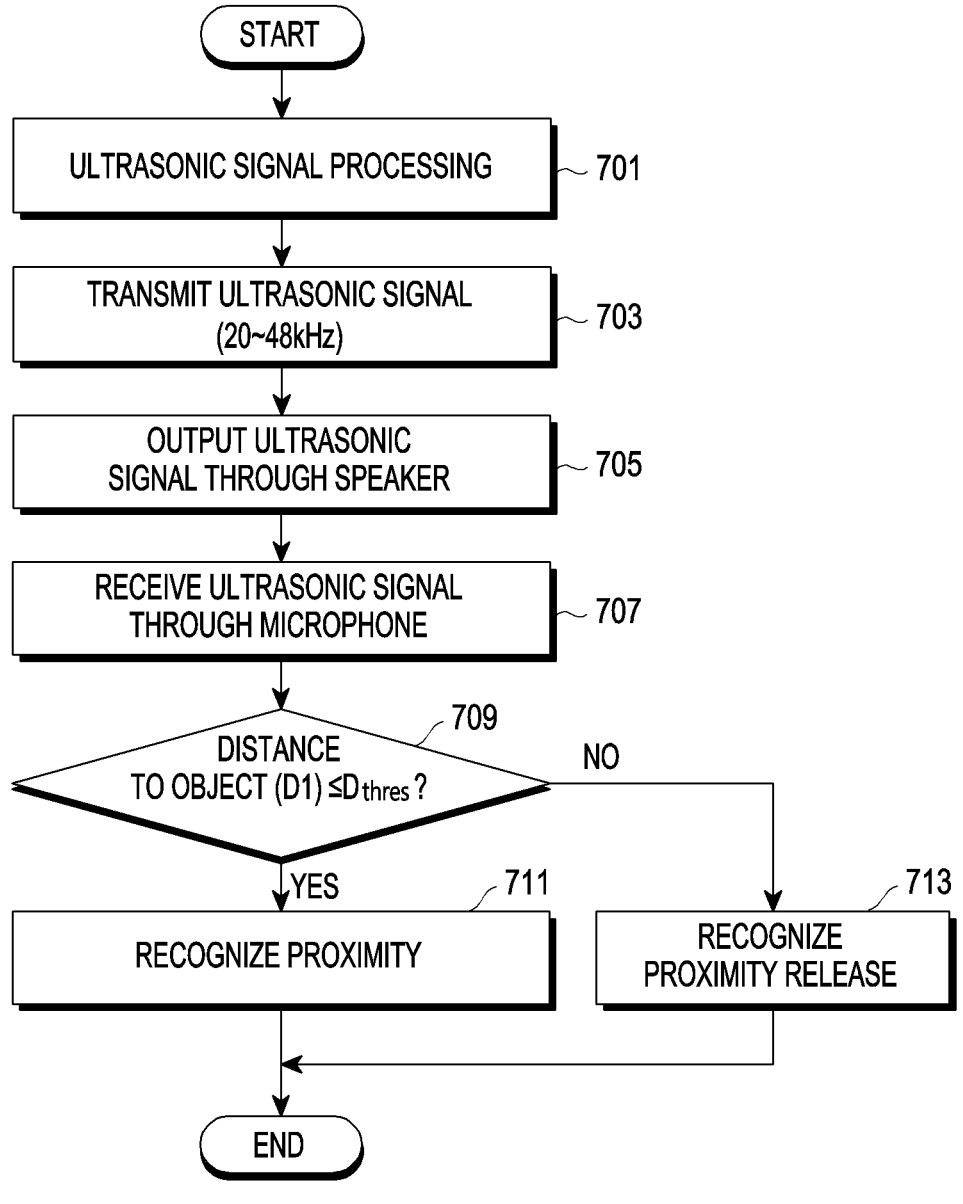
FIG. 7 is a flowchart illustrating a method of implementing an ultrasonic proximity sensor by an electronic device according to various embodiments.

FIG. 7 is a flowchart illustrating a method of implementing an ultrasonic proximity sensor by an electronic device according to various embodiments.

Referring to FIG. 7, the electronic device (e.g., the electronic device 101 of FIG. 1) may start ultrasonic signal processing in operation 701, and generate an ultrasonic signal (e.g., 20 to 48 kHz) through an ultrasonic generation module (or ultrasonic engine) implemented in an audio processing module or a sensor hub and transmit the ultrasonic signal to a speaker in operation 703. The electronic device may output the ultrasonic signal to the outside through the speaker in operation 705, and receive at least a part of the ultrasonic signal output through the speaker through a microphone in operation 707. According to various embodiments, the ultrasonic signal received through the microphone may be an ultrasonic signal output from the speaker and reflected from an object.

In operation 709, the electronic device may measure a distance D1 between the electronic device and the object based on the ultrasonic signal output through the speaker and the ultrasonic signal received through the microphone, and determine whether the distance D1 between the electronic device and the object is less than or equal to a preset threshold $D_{thres}$. According to various embodiments, when the distance D1 between the electronic device and the object is less than or equal to the preset threshold $D_{thres}$ (operation 709—Yes), the electronic device may identify that the electronic device and the object are in close proximity in operation 711. According to various embodiments, when the distance D1 between the electronic device and the object is greater than the preset threshold $D_{thres}$ (operation 709—No), the electronic device may identify that the electronic device and the object are not in close proximity in operation 713.

Figure 8:
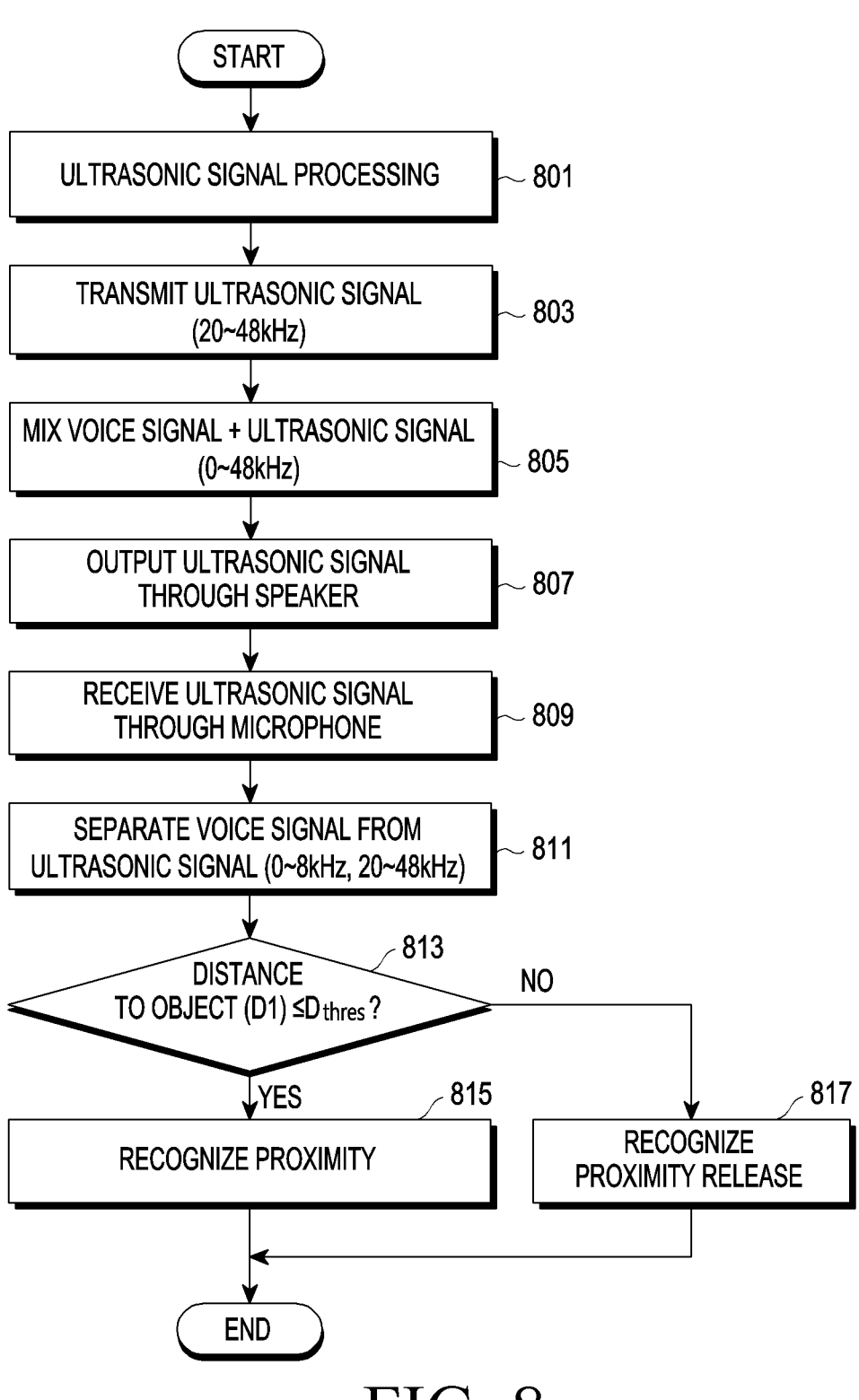
FIG. 8 is a flowchart illustrating a method of implementing an ultrasonic proximity sensor by an electronic device according to various embodiments.

FIG. 8 is a flowchart illustrating a method of implementing an ultrasonic proximity sensor by an electronic device according to various embodiments.

Referring to FIG. 8, the electronic device (e.g., the electronic device 101 of FIG. 1) may start ultrasonic signal processing in operation 801. In operation 803, the electronic device may generate an ultrasonic signal (e.g., 20 to 48 kHz) through an ultrasonic generation module (or ultrasonic engine) implemented in an audio processing module or a sensor hub. In operation 805, the electronic device may generate a first signal (e.g., 0 to 48 kHz) by mixing the generated ultrasonic signal with a voice signal. According to various embodiments, the electronic device may transmit the first signal to a speaker. The electronic device may output the first signal in which the ultrasonic signal is mixed with the voice signal to the outside through the speaker in operation 807 and receive a second signal being at least a part of the first signal output through the speaker through the microphone in operation 809. According to various embodiments, the ultrasonic signal included in the second signal received through the microphone may be an ultrasonic signal output from the speaker and reflected from an object.

In operation 811, the electronic device may separate the second signal into the voice signal (e.g., 0 to 8 kHz) from the ultrasonic signal (e.g., 20 to 48 kHz). In operation 813, the electronic device may measure a distance D1 between the electronic device and the object based on the ultrasonic signal output through the speaker and the ultrasonic signal received through the microphone, and determine whether the distance D1 between the electronic device and the object is less than or equal to a preset threshold $D_{thres}$. According to various embodiments, when the distance D1 between the electronic device and the object is less than or equal to the preset threshold $D_{thres}$ (operation 813—Yes), the electronic device may identify that the electronic device and the object are in close proximity in operation 815. According to various embodiments, when the distance D1 between the electronic device and the object is greater than the preset threshold $D_{thres}$ (operation 813—No), the electronic device may identify that the electronic device and the object are not in close proximity in operation 817.

Figure 9:
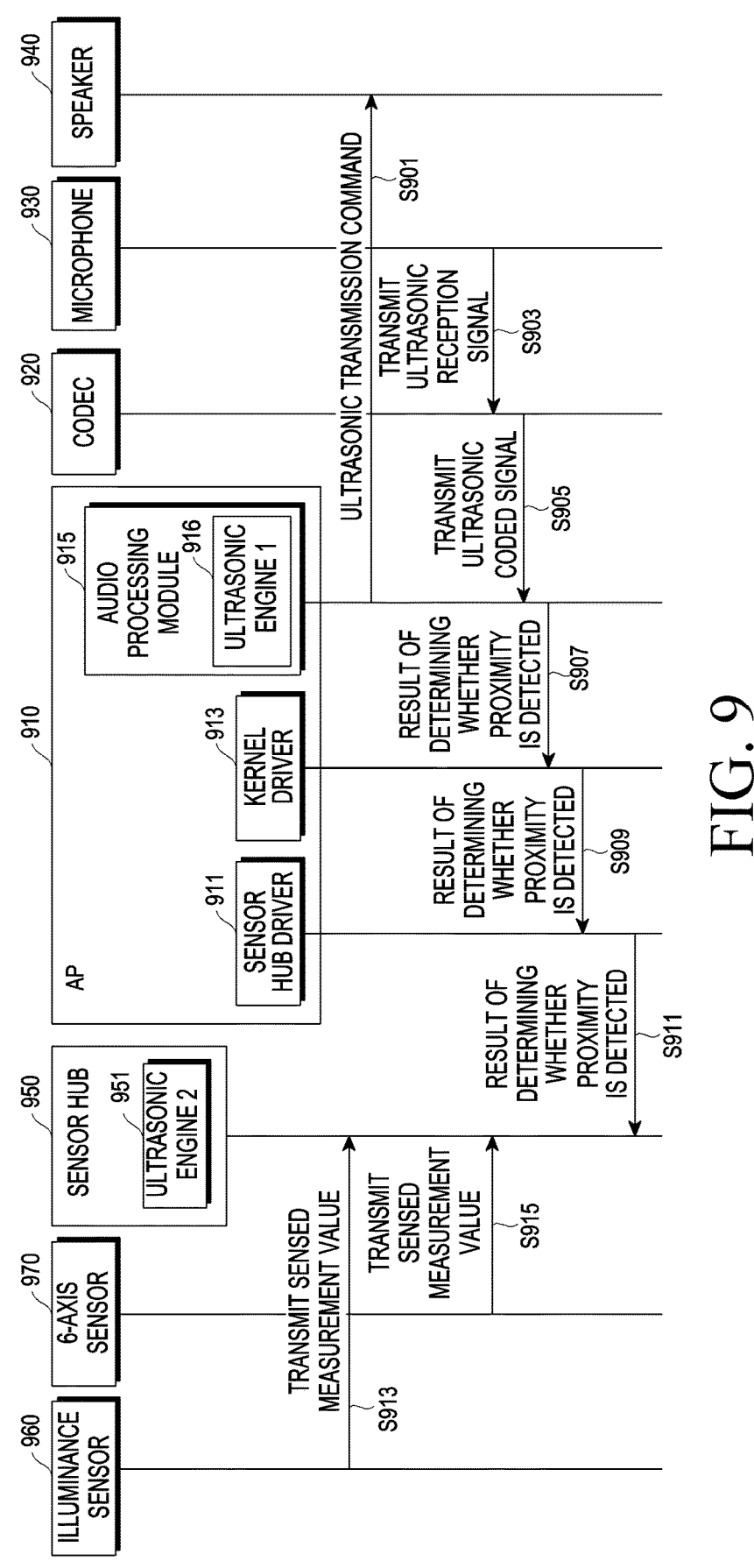
FIG. 9 is a diagram illustrating an operation of determining whether an object is close by a sensor hub included in an electronic device according to various embodiments.

FIG. 9 is a diagram illustrating an operation of determining whether an object is close by a sensor hub included in an electronic device according to various embodiments.

Referring to FIG. 9, the electronic device may include an AP 910, a codec 920, a microphone 930, a speaker 940, a sensor hub 950, an illuminance sensor 960, and a 6-axis sensor 970. According to various embodiments, the AP 910 may include a sensor hub driver 911, a kernel driver 913, and an audio processing module 915. According to various embodiments, the audio processing module 915 included in the AP 910 may include a first ultrasonic engine (ultrasonic engine 1) 916 for generating or processing an ultrasonic signal. According to various embodiments, the sensor hub 950 may include a second ultrasonic engine (ultrasonic engine 2) 951 for generating or processing an ultrasonic signal.

Referring to FIG. 9, the audio processing module (or ABOX) 915 may transmit an ultrasonic transmission command to the speaker 940, and the speaker 940 may output an ultrasonic signal to the outside based on the ultrasonic transmission command in operation S901. In operation S903, the microphone 930 may receive an ultrasonic reception signal including at least a part of the ultrasonic signal output from the speaker 940 and transmit the ultrasonic reception signal to the codec 920. In operation S905, the codec 920 may encode the ultrasonic reception signal, generate an ultrasonic coded signal according to an encoding result, and transmit the generated ultrasonic coded signal to the audio processing module 915. In operation S907, the audio processing module 915 may determine whether the electronic device and an object are in close proximity based on the ultrasonic coded signal, and transmit a result of determining whether the object is close to the kernel driver 913. In operation S909, the kernel driver 913 may transmit the result of determining whether the object is close to the sensor hub driver 911. In operation S911, the sensor hub driver 911 may transmit the result of determining whether the object is close to the sensor hub 950.

The illuminance sensor 960 may transmit a sensed measurement value to the sensor hub 950 in operation S913, and the 6-axis sensor 970 may transmit a sensed measurement value to the sensor hub 950 in operation S915. According to various embodiments, the sensor hub 950 may finally determine whether the object is closed to the electronic device based on the sensed measurement values received from the illuminance sensor 960 and the 6-axis sensor 970 and the result of determining whether the object is close, received from the sensor hub driver 911.

Figure 10:
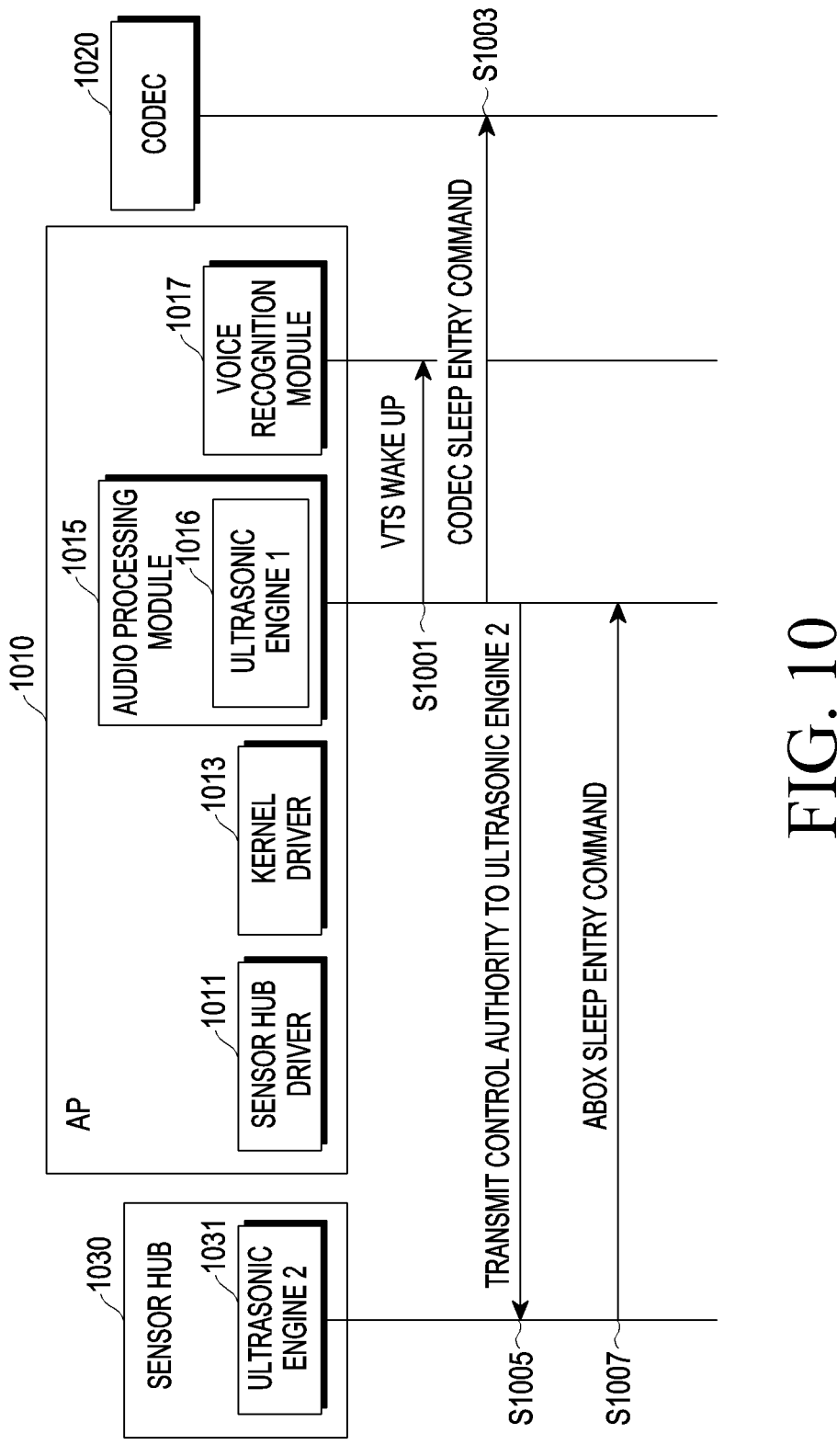
FIG. 10 is a diagram illustrating an operation of entering a sleep state by some components in an electronic device to implement an operation of a low-power ultrasonic proximity sensor according to various embodiments.

FIG. 10 is a diagram illustrating an operation of entering a sleep state by some components of an electronic device in order to implement an operation of a low-power ultrasonic proximity sensor according to various embodiments.

Referring to FIG. 10, the electronic device may include an AP 1010, a codec 1020, and a sensor hub 1030. According to various embodiments, the AP 1010 may include a sensor hub driver 1011, a kernel driver 1013, an audio processing module 1015, and a voice recognition module 1017. According to various embodiments, the audio processing module 1015 included in the AP 1010 may include a first ultrasonic engine (ultrasonic engine 1) 1016 for generating or processing an ultrasonic signal. According to various embodiments, the sensor hub 1030 may include a second ultrasonic engine (ultrasonic engine 2) 1031 for generating or processing an ultrasonic signal.

According to various embodiments, the electronic device of FIG. 10 may configure the audio processing module 1015 and the codec 1020 to enter the sleep state and configure the voice recognition module 1017 to enter a wakeup state in order to implement the operation of a low-power ultrasonic proximity sensor. In operation S1001, the audio processing module 1015 may transmit a VTS wakeup message to the voice recognition module 1017 so that the voice recognition module 1017 enters the wakeup state. In operation S1003, the audio processing module 1015 may transmit a CODEC sleep entry command message to the codec 1020 so that the codec 1020 enters the sleep state. According to an embodiment, the VTS wakeup message and/or the CODEC sleep entry command message may include a software signal or an electrical signal (e.g., a pull-up, pull-down, or timing signal).

In operation 51005, the audio processing module 1015 may transmit, to the sensor hub 1030, a control authority transfer message allowing the second ultrasonic engine (ultrasonic engine 2) 1031 included in the sensor hub 1030 to have a control authority to control ultrasonic signal processing. In operation 51007, the sensor hub 1030 receiving the control authority transfer message may transmit an ABOX sleep entry command message to the audio processing module 1015 so that the audio processing module 1015 enters the sleep state.

Figure 11:
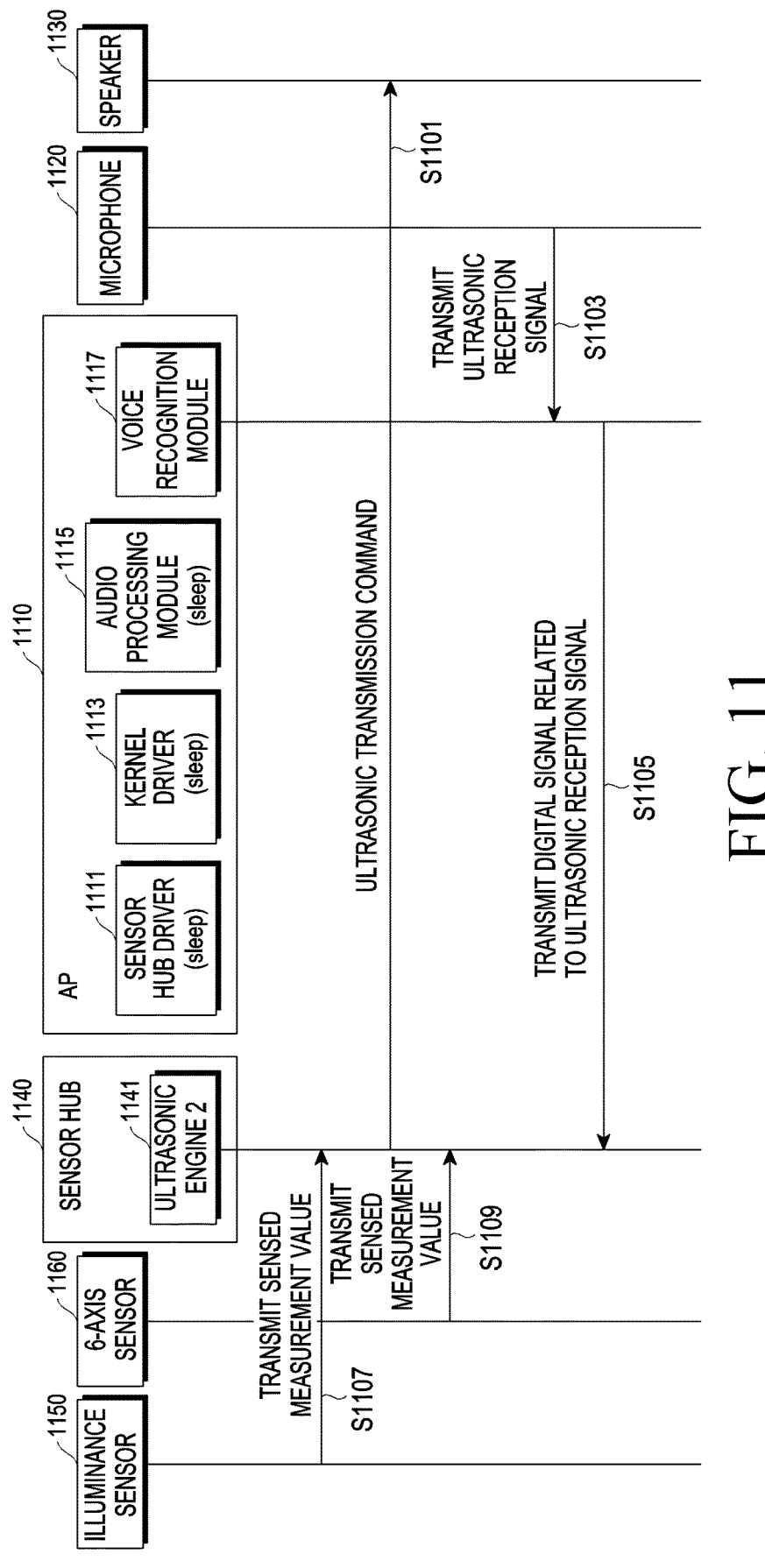
FIG. 11 is a diagram illustrating an operation of determining whether an object is close by a sensor hub included in an electronic device according to various embodiments.

FIG. 11 is a diagram illustrating an operation of determining whether an object is close by a sensor hub included in an electronic device according to various embodiments.

Referring to FIG. 11, the electronic device may include an AP 1110, a microphone 1120, a speaker 1130, a sensor hub 1140, an illuminance sensor 1150, and a 6-axis sensor 1160.

According to various embodiments, the AP 1110 may include a sensor hub driver 1111, a kernel driver 1113, an audio processing module 1115, and a voice recognition module 1117. According to various embodiments, when the audio processing module 1115 included in the AP 1110 is in the sleep state, a first ultrasonic engine (not shown) included in the audio processing module 1115 may be deactivated (or set to the sleep state). According to various embodiments, the sensor hub 1140 may include a second ultrasonic engine (ultrasonic engine 2) 1141 for generating or processing an ultrasonic signal.

According to various embodiments, when the audio processing module 1115 and a codec (not shown) are in the sleep state, and the voice recognition module 1117 is in the wakeup state according to the operation of FIG. 10, the sensor hub 1140 may transmit an ultrasonic transmission command to the speaker 1130, and the speaker 1130 may output an ultrasonic signal to the outside in operation S1101. In operation S1103, the microphone 1120 may receive an ultrasonic reception signal corresponding to at least a part of the ultrasonic signal output from the speaker 1130 and transmit the ultrasonic reception signal to the voice recognition module 1117. In operation S1105, the voice recognition module 1117 may transmit a digital signal related to the ultrasonic reception signal transmitted from the microphone 1120 to the sensor hub 1140.

The illuminance sensor 1150 may transmit a sensed measurement value to the sensor hub 1140 in operation S1107, and the 6-axis sensor 1160 may transmit a sensed measurement value to the sensor hub 1140 in operation S1109. According to various embodiments, the sensor hub 1140 may determine whether an object is close to the electronic device based on the sensed measurement values received from the illuminance sensor 1150 and the 6-axis sensor 1160 and the digital signal related to the ultrasonic reception signal received from the voice recognition module 1117.

According to various embodiments, an electronic device (e.g., 101 in FIG. 1) may include an AP (e.g., 410 in FIG. 4) and a sensor hub (e.g., 460 in FIG. 4). According to various embodiments, the AP may control a speaker to output a first signal including an ultrasonic signal to the outside of the electronic device, and control to receive a second signal including at least a part of the signal output through the speaker through a microphone. According to various embodiments, while an audio processing module included in the AP is in a sleep state, a sensor hub may receive the second signal input through the microphone through a voice recognition module included in the AP and determine whether an object is close to the electronic device based on at least a result of comparing the signal received through the voice recognition module with the first signal output through the speaker.

According to various embodiments, the sensor hub may receive the second signal input to the voice recognition module through the microphone and received from the voice recognition module included in the AP and determine whether an object is close to the electronic device based on at least a result of comparing the signal received through the voice recognition module with the first signal output through the speaker.

According to various embodiments, the audio processing module included in the application processor may transmit a first waking up message to the voice recognition module. According to various embodiments, the audio processing module included in the application processor may transmit a second message allowing an audio codec included in the electronic device to enter the sleep state to the audio codec.

According to various embodiments, the sensor hub may receive a sensed first measurement value from an illuminance sensor and a sensed second measurement value from a 6-axis sensor. According to various embodiments, the sensor hub may determine whether the object is close to the electronic device based on the first measurement value and the second measurement value as a result of comparing the signal received through the voice recognition module with the first signal output through the speaker. According to various embodiments, the audio processing module included in the application processor may transmit a third message transferring a control authority for ultrasonic signal processing to the sensor hub, and receive a sleep entry command in return for the third message from the sensor hub.

According to various embodiments, the voice recognition module may include: a plurality of buffers; and an LPF for filtering the second signal and transmitting the filtered second signal to one of the plurality of buffers. According to various embodiments, the electronic device may further include an HPF for filtering the second signal and transmitting the filtered second signal to the sensor hub. According to various embodiments, the audio processing module may include a first ultrasonic engine for generating or processing the ultrasonic signal, and the sensor hub may include a second ultrasonic engine for generating or processing the ultrasonic signal. According to various embodiments, the ultrasonic signal may be generated by the second ultrasonic engine, while the audio processing module included in the application processor is in the sleep state.

The electronic device according to various embodiments may be one of various types of electronic devices. The electronic devices may include, for example, a computer device, a portable communication device (e.g., a smartphone), a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "$1^{st}$" and "$2^{nd}$", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with the disclosure, the term "module" may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., a program) including one or more instructions that are stored in a storage medium (e.g., internal memory or external memory) that is readable by a machine (e.g., a master device or a task performing device). For example, a processor of the machine (e.g., the master device or the task performing device) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
a microphone;
a speaker;
an application processor including an audio processing module and a voice recognition module; and
a sensor hub,
wherein, while the audio processing module is in an active state, the application processor is configured to generate an ultrasonic signal and provide the ultrasonic signal to the speaker via the audio processing module, and
wherein, while the audio processing module is in a sleep state, the sensor hub is configured to:
generate the ultrasonic signal and provide the ultrasonic signal to the speaker so that the speaker outputs a first signal including the ultrasonic signal;
receive from the voice recognition module a second signal input through the microphone; and
determine whether an object is close to the electronic device based on at least the first signal and the second signal,
wherein a first ultrasonic engine included in the audio processing module generates the ultrasonic signal while the audio processing module is in the active state, and a second ultrasonic engine, which is different from the first ultrasonic engine and included in the sensor hub, generates the ultrasonic signal while the audio processing module is in the sleep state.

2. The electronic device of claim 1, wherein the audio processing module included in the application processor is configured to transmit, to the voice recognition module, a first message for waking up the voice recognition module before entering the sleep state.

3. The electronic device of claim 1, wherein the audio processing module included in the application processor is configured to transmit, to an audio codec, a second message for allowing the audio codec included in the electronic device to enter the sleep state before entering the sleep state.

4. The electronic device of claim 1, wherein the sensor hub is configured to receive a sensed first measurement value from an illuminance sensor and receive a sensed second measurement value from a 6-axis sensor.

5. The electronic device of claim 4, wherein the sensor hub is configured to determine whether the object is close to the electronic device based on the first signal, the second signal, the first measurement value, and the second measurement value.

6. The electronic device of claim 1, wherein the audio processing module included in the application processor is configured to transmit, to the sensor hub, a third message for transferring a control authority for ultrasonic signal processing, and receive, from the sensor hub, a sleep entry command in return for the third message.

7. The electronic device of claim 1, wherein the voice recognition module includes:
a plurality of buffers; and
a low pass filter (LPF) configured to filter the second signal and transmit the filtered second signal to one of the plurality of buffers.

8. The electronic device of claim 1, further comprising:
a high pass filter (HPF) configured to filter the second signal and transmit the filtered second signal to the sensor hub.

9. The electronic device of claim 1, wherein the audio processing module includes a first ultrasonic engine which is configured to generate or process the ultrasonic signal, and wherein the sensor hub includes a second ultrasonic engine which is configured to generate or process the ultrasonic signal.

10. The electronic device of claim 9, wherein the ultrasonic signal is generated by the second ultrasonic engine, while the audio processing module included in the application processor is in the sleep state.

11. A method of determining whether an object is close to an electronic device including an application processor including an audio processing module and a voice recognition module, a microphone, a speaker, and a sensor hub, the method comprising:

while the audio processing module is in an active state, generating, by the application processor, an ultrasonic signal and providing, by the application processor, the ultrasonic signal to the speaker via the audio processing module; and while the audio processing module is in a sleep state:

generating, by the sensor hub, the ultrasonic signal and providing, by the sensor hub, the ultrasonic signal to the speaker so that the speaker outputs a first signal including the ultrasonic signal, receiving, by the sensor hub, from the voice recognition module a second signal input through the microphone in the sleep state of the audio processing module, and determining, by the sensor hub, whether an object is close to the electronic device based on at least the first signal and the second signal, wherein a first ultrasonic engine included in the audio processing module generates the ultrasonic signal while the audio processing module is in the active state, and a second ultrasonic engine, which is different from the first ultrasonic engine and included in the sensor hub, generates the ultrasonic signal while the audio processing module is in the sleep state.

12. The method of claim 11, further comprising:

transmitting to the voice recognition module, by the audio processing module, a first message for waking up the voice recognition module before entering the sleep state.

13. The method of claim 11, further comprising:

transmitting to the audio codec, by the audio processing module, a second message for allowing an audio codec included in the electronic device to enter the sleep state before entering the sleep state.

14. The method of claim 11, further comprising:

receiving, by the sensor hub, a sensed first measurement value from an illuminance sensor and receiving a sensed second measurement value from a 6-axis sensor.

15. The method of claim 14, further comprising:

determining, by the sensor hub, whether the object is close to the electronic device based on the first signal, the second signal, the first measurement value, and the second measurement value.

\* \* \* \* \*